United States Patent
Bellio et al.

(10) Patent No.: US 12,134,211 B2
(45) Date of Patent: Nov. 5, 2024

(54) METHOD AND APPARATUS FOR PROCESSING PLASTICS

(71) Applicant: PIOVAN S.P.A., Santa Maria di Sala (IT)

(72) Inventors: Enrico Bellio, Ponzano Veneto (IT); Davide Cappellini, Soncino (IT)

(73) Assignee: PIOVAN S.P.A., Venice (IT)

( * ) Notice: Subject to any disclaimer, the term of this patent is extended or adjusted under 35 U.S.C. 154(b) by 534 days.

(21) Appl. No.: 17/430,344

(22) PCT Filed: Feb. 19, 2020

(86) PCT No.: PCT/IB2020/051359
§ 371 (c)(1),
(2) Date: Aug. 12, 2021

(87) PCT Pub. No.: WO2020/170139
PCT Pub. Date: Aug. 27, 2020

(65) Prior Publication Data
US 2022/0134601 A1 May 5, 2022

(30) Foreign Application Priority Data
Feb. 22, 2019 (IT) .................. 102019000002607

(51) Int. Cl.
*B29B 13/06* (2006.01)
*B29B 13/02* (2006.01)
(Continued)

(52) U.S. Cl.
CPC ............ *B29B 13/065* (2013.01); *B29B 13/02* (2013.01); *F26B 3/06* (2013.01); *F26B 17/14* (2013.01); *F26B 21/04* (2013.01)

(58) Field of Classification Search
CPC ......... B29B 13/00; B29B 13/02; B29B 13/06; B29B 13/065; B29B 13/03; F26B 3/00;
(Continued)

(56) References Cited

U.S. PATENT DOCUMENTS

| 4,591,475 A | * | 5/1986 | Tomka | ..................... B29C 45/00 425/572 |
| 2007/0294121 A1 | | 12/2007 | Galt et al. | |
| 2015/0197054 A1 | * | 7/2015 | White | ..................... B29C 45/77 425/149 |

FOREIGN PATENT DOCUMENTS

| DE | 10 2004 052 499 A1 | 7/2006 |
| EP | 0 970 793 A1 | 1/2000 |
| WO | 2017/103721 A1 | 6/2017 |

OTHER PUBLICATIONS

May 25, 2020 International Search Report issued in International Patent Application No. PCT/IB2020/051359.
(Continued)

*Primary Examiner* — Christopher T Schatz
(74) *Attorney, Agent, or Firm* — Oliff PLC

(57) ABSTRACT

A method and an apparatus are disclosed for processing plastics, in which the material in incoherent solid state is dehumidified in a hopper and is then melted in an extruder, after which the molten material is used in a moulding device for moulding by injection and/or by blow moulding and/or compression, and in which a set point pressure value of the molten material is set on the basis of a measured residual humidity value of the dehumidified incoherent solid material, so as to decrease the pressure value by a preset variation value if the measured residual humidity value is lower than a reference value and to increase the pressure value by a preset variation value if the measured residual humidity value is higher than said reference value.

10 Claims, 1 Drawing Sheet

(51) Int. Cl.
*F26B 3/06* (2006.01)
*F26B 17/14* (2006.01)
*F26B 21/04* (2006.01)

(58) Field of Classification Search
CPC .... F26B 3/02; F26B 3/06; F26B 17/00; F26B 17/10; F26B 17/14; F26B 21/00; F26B 21/04
See application file for complete search history.

(56) References Cited

OTHER PUBLICATIONS

May 25, 2020 Written Opinion issued in International Patent Application No. PCT/IB2020/051359.

\* cited by examiner

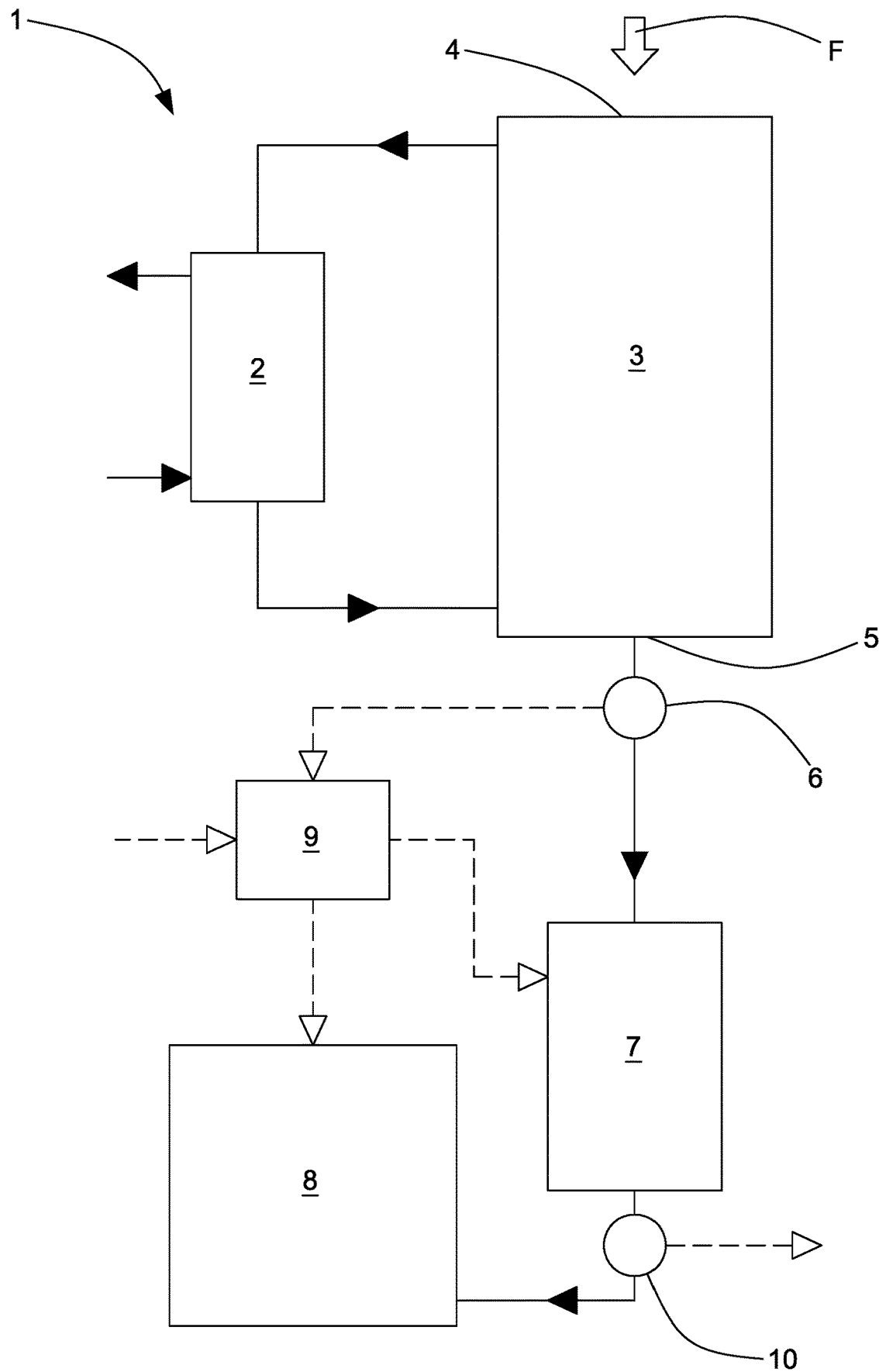

METHOD AND APPARATUS FOR PROCESSING PLASTICS

BACKGROUND OF THE INVENTION

The invention relates to a method and an apparatus for processing material, in particular for processing incoherent material made of solid particles, such as for example material in granules, microgranules, powder, flakes, pellets or the like, in particular solid particles of polymer material.

Specifically, but not exclusively, the invention may be applied in the industry for transforming plastics in order to control one or more users of plastics, in particular plants that comprise means for generating a process fluid, means for dehumidifying and/or drying solid material with the aforesaid process fluid, means for melting the dehumidified and/or dried solid material and means for moulding the molten material, in particular by injection moulding and/or blow moulding and/or compression moulding.

Patent publication WO 2017/103721 A1 discloses a system for processing plastics, comprising a generator of a process fluid, a material dehumidifying hopper, a melting device for melting the dehumidified material and an injection moulding device for moulding the molten material, in which a set point value of a parameter of the process fluid, for example the dew point or the flowrate, is modified on the basis of a measured value of the injection pressure of the material in molten state.

Patent publications US 2015/197054 A1 and DE 102004052499 A1 disclose a method according to the preamble of claim 1.

One of the problems of known plants for processing plastics is setting a correct set point value of at least one pressure of the plastics in molten state, a pressure that is suitable for running the plant appropriately, for example an extruding and/or moulding limit pressure (for example an injection limit pressure of the material in an injection mould) and/or a limit pressure of the material transferred from a melting device to a moulding device.

Currently, in moulding plants that process plastics from material in incoherent state (polymer granules), a method is known for managing the plant in which the operator sets at least one pressure limit value of the material (for example an extrusion and/or transfer and/or moulding pressure, in general the injection pressure) on a historical basis and/or in function of data supplied by the manufacturer of the mould and/or following tests run under moulding conditions by pilot plants in the laboratory.

Another problem is refining the aforesaid set point value of the limit pressure during the process.

In order to achieve a sufficient degree of refinement, in known plants, the operator is obliged to modify manually the set value of the operating pressure of the plant on the basis of the observation of the quality of the finished product in the course of the process.

Reaching the ideal pressure set point value is a delicate operation that requires care and expertise and that can moreover take a relatively long time, with a consequent reduction in the potentiality of the system, an increase of production waste, an increase in consumption and process instability.

SUMMARY OF THE INVENTION

One object of the invention is to provide an alternative solution to the problem of controlling a method and/or an apparatus for processing plastics.

One advantage is to permit suitable control of a process for moulding plastics.

One advantage is to facilitate the correct setting of at least one set point value of the pressure of the molten material to perform moulding.

One advantage is to provide a method and/or an apparatus for processing material that permits, during the course of the process, appropriate refining of a set point value of a limit pressure of the processed material.

One advantage is to reach a suitable pressure value of the material, during the process, in a rapid and reliable manner.

One advantage is to devise a method and/or an apparatus for processing material that enables production waste and energy consumption to be reduced.

One advantage is to make available a method and/or an apparatus for processing material in which the stability and/or the efficiency of the process are improved.

Such objects and advantages, and also others, are achieved by a method and/or an apparatus according to one or more of the claims set out below.

In one embodiment, at least one pressure of the plastics in molten state is controlled that is suitable for performing moulding, on the basis of at least one signal supplied by sensor means that determines in real time a value of residual humidity of the incoherent solid plastics exiting dehumidifying and/or drying means connected in fluid communication with the means for performing moulding.

In one embodiment, an apparatus for processing plastics comprises means for dehumidifying incoherent solid material, means for melting the incoherent solid material and means for moulding the molten material, in which a set point value for controlling the pressure of the molten material is set on the basis of a measured humidity value of the dehumidified incoherent solid material, so as to decrease the aforesaid set point value of the pressure, for example by a preset variation value, if the measured humidity value is lower than a reference value, and to increase the aforesaid set point value of the pressure, for example by a preset variation value, if the measured humidity value is higher than a reference value.

BRIEF DESCRIPTION OF THE DRAWINGS

The invention can be better understood and implemented with reference to the attached drawings that illustrate an embodiment thereof by way of non-limiting example, in which:

FIG. 1 shows a diagram of one embodiment of an apparatus for processing material made according to the present invention.

DETAILED DESCRIPTION

With reference to the aforesaid FIGURE, overall with 1 an apparatus for processing material, in particular for processing incoherent material made of solid particles, such as for example material in granule, microgranule, powder, flake, globule, pellet, chip or similar form, in particular solid particles of plastics, such as for example the polymer granules generally used in the industrial sector of the transformation of plastics. The plastics may comprise, for example, polyethylene terephthalate (PET).

The apparatus 1 for processing may comprise, in particular, means for dehumidifying and/or drying incoherent material. The means for dehumidifying and/or drying may comprise, in particular, at least one generator 2 of a process fluid, for example a generator of hot gas (air).

The means for dehumidifying and/or drying may comprise, in particular, at least one container 3, for example a dehumidification hopper, where the incoherent material is passed through by the process fluid.

The container 3 comprises at least one (for example upper) inlet 4 of the material to be dehumidified and at least one (for example lower) outlet 5 of the dehumidified material. The flow F of the material in the container 3 may be directed, as in this embodiment, from top to bottom.

An inlet of the process fluid in the container 3 may be connected, as in this embodiment, to an outlet of the generator 2 of the process fluid. An outlet of the process fluid from the container 3 may be connected, as in this embodiment, to an inlet of the generator 2 of the process fluid.

The generator 2 may comprise, in particular, heating means for heating the process fluid and at least one dehumidifier or at least two dehumidifiers arranged in parallel and configured to operate alternatingly with operating cycles comprising a work phase and a regenerating phase.

The means for dehumidifying and/or drying incoherent material may comprise, in particular, the means for dehumidifying (generator 4 of the process fluid and dehumidifying and/or drying hopper 5) disclosed in patent publication WO 2017/103721 A1 which is included here by reference.

The apparatus 1 for processing may comprise, in particular, means for measuring a residual humidity value of the incoherent material dehumidified by the aforesaid means for dehumidifying.

The means for measuring the residual humidity may comprise, in particular, at least one humidity sensor 6, for example a relative humidity sensor and/or an absolute humidity sensor. The humidity sensor 6 may comprise, in particular, a sensor of electric (capacitive or resistive) type or of another type.

The means for measuring the humidity may be arranged, in particular, after the outlet 5 of the dehumidified material or near the outlet 5.

The apparatus 1 for processing may comprise, in particular, means for transforming the dehumidified incoherent material into molten material. The means for transforming may comprise, in particular, at least one melting device 7, for example an extruder (in particular an extruder of the feed screw type), arranged for receiving the incoherent dehumidified material exiting the means for dehumidifying.

The melting device 7 may be connected in flowing communication, as in this case, to the container 3 so as to receive the material exiting the container 3.

The melting device 7 may comprise, in particular, a device of known type, used in the context of a plant for processing plastics, to melt incoherent plastics.

The means for transforming the dehumidified incoherent material into molten material may comprise, in particular, the means for melting the dehumidified incoherent plastics disclosed in patent publication WO 2017/103721 A1 (extruder 19) which is included here by reference.

The means for measuring the humidity (humidity sensor 6) may be arranged, in particular, before an inlet of the means for transforming the dehumidified incoherent material into molten material, or near the inlet, to measure the humidity of the solid material before melting.

The apparatus 1 for processing may comprise, in particular, means for moulding the material after the material has been melted by the aforesaid melting device 7. The means for moulding may comprise, in particular, at least one moulding device 8, for example an injection moulding and/or blow moulding and/or compression moulding and/or transfer moulding device. The moulding device 8 may comprise, as in this specific embodiment, a press for injection of plastics.

The means for moulding the molten material may comprise, in particular, the means for moulding disclosed in patent publication WO 2017/103721 A1 (injection press 22) which is included here by reference.

The apparatus 1 for processing may comprise, in particular, means for adjusting a pressure (in particular for setting a set point value of the pressure) of the material that is melted by the aforesaid means for transforming (melting device 7) depending on the aforesaid residual humidity value of the incoherent material that is dehumidified by the means for dehumidifying. The means for adjusting may be configured, in particular, to set non-nil set point values of a pressure of the molten material as a function of at least one physical-chemical feature (for example the humidity) of the dehumidified incoherent material. The means for adjusting may be configured, in particular, to increase or decrease a set point value of a pressure of the molten material as a function of at least one physical-chemical feature (for example the humidity) of the dehumidified incoherent material.

The means for adjusting may be configured, in particular, to control (in particular to set a set point value of) an extrusion pressure in the melting device 7, and/or to control (in particular to set a set point value of) a moulding pressure in the moulding device 8, and/or to control (in particular to set a set point value of) a transfer pressure between the melting device 7 and the moulding device 8.

The means for adjusting may comprise, in particular, programmable electronic control means (for example a processor 9).

The apparatus 1 may comprise, for example, at least one pressure sensor 10 (for example a pressure sensor of known type) arranged to measure, for example directly, an injection pressure, where by injection pressure it is possible to mean the pressure at which the plastics in molten state exits the melting device 7 or the pressure of the plastics in molten state entering the moulding device 8.

The pressure sensor 10 may be arranged, in particular, between the melting device 7 and the moulding device 8. The pressure sensor 10 may send measuring signals to the processor 9.

The programmable electronic control means may be provided with computer program instructions implementable on the control means to perform at least the following operations: comparing the measured humidity value $H_M$ with a reference humidity value $H_R$; decreasing or increasing a set point value of the pressure of the molten material (for example a limit pressure $P_{LIM}$) if the humidity value $H_M$ is less or, respectively, higher than the reference humidity value $H_R$.

The programmable electronic control means may be provided, in particular, with computer programme instructions implementable in such a manner as to perform the operation of setting a pressure variation value $\Delta P$ on the basis of which to decrease or increase the set point value of the pressure of the molten material. The programmable electronic control means may be provided, in particular, with computer programme instructions to perform the operations of performing for subsequent interactions the aforesaid operations of comparing $H_M$ with $H_R$ and subsequently of decreasing or increasing the pressure (set point value of the pressure), in particular the interactions can be performed at preset (constant or variable) time intervals.

The programmable electronic control means may be provided, in particular, with computer programme instructions that are implementable so as to perform the operations of receiving a signal from the pressure sensor 10 (signal corresponding to a detected value of the injection pressure of the plastics in molten state), comparing the detected injection pressure value with a limit value $P_{LIM}$ of the injection pressure (where the limit value $P_{LIM}$ is a set point value that is adjusted on the basis of the residual humidity value of the dehumidified incoherent material) and sending command signals to the melting device 7 to modify the operating pressure of the device on the basis of the aforesaid comparison (i.e. according to whether the detected value of the injection pressure of the molten material is less, the same or greater than the limit value $P_{LIM}$ set on the basis of the detected value of the residual humidity).

The operation of the apparatus 1 can actuate a method for processing material that may comprise, in particular, the steps of dehumidifying the incoherent material, measuring a residual humidity value $H_M$ of the dehumidified incoherent material, transforming the dehumidified incoherent material into molten material, using the molten material for moulding, and controlling a pressure (in particular setting a set point value of the pressure, for example a set point value of the aforesaid limit pressure $P_{LIM}$) of the molten material on the basis of the humidity value $H_M$ of the dehumidified incoherent material.

As in the specific embodiment disclosed above, the incoherent material may be dehumidified in the container 3 by a process fluid (heated air), the dehumidified incoherent material may be transferred in line from the outlet 5 of the container 3 to the inlet of the melting device 7 (an extruder) where it is transformed into molten material, the humidity $H_M$ of the dehumidified incoherent material may be measured at the outlet 5 of the container 3, at the inlet of the melting device 7, or between the outlet 5 of the container 3 and the inlet of the melting device 7.

The molten material may be used, in particular, to perform at least one moulding operation (for example by injection and/or compression and/or blowing and/or transfer) in the moulding device 8.

As said, the pressure of the molten material that is adjusted on the basis of the humidity $H_M$ (by modifying a set point value of the pressure, for example a limit pressure $P_{LIM}$) may comprise an extrusion pressure in the melting device 7 and/or a moulding pressure in the moulding device 8 and/or a transfer pressure between the melting device 7 and the moulding device 8.

In particular, adjustment is performed in such a manner as to decrease the set point pressure value (for example by a preset value $\Delta P$) if $H_M < H_R$ or $H_M \leq H_R$ and so as to increase the set point pressure value (for example by a preset value $\Delta P$) if $H_M \geq H_R$ or $H_M > H_R$.

The variation pressure value $\Delta P$ may be settable, for example it may consist of a preset constant fixed value. The variation pressure value $\Delta P$ may be modifiable, for example by a user interface connected to the programmable electronic control means.

In this embodiment, the steps of comparing $H_M$ with $H_R$ and subsequently of decreasing or increasing the pressure of the incremental value $\Delta P$, is performed by subsequent iterations at preset time intervals, although it is possible to perform an iterative process governed not on a temporal basis or not only on a temporal basis, for example by following the course of an operating parameter of the apparatus 1 in real time (in particular a parameter indicating the humidity of the material exiting the container 3) to anticipate or delay the adjusting intervention following monitoring of this parameter.

The method and the apparatus disclosed above enable a control process to be implemented (setting non nil set point values) of the pressure of the molten material (for example injection pressure and/or extrusion pressure and/or transfer pressure and/or compression pressure) as a function (by detection in real time) of the value of at least one parameter (the residual humidity) of the solid material (granule) exiting the means for dehumidifying (hopper) before melting.

The aforesaid control process, in particular run for subsequent iterations by a calculation algorithm, enables an ideal set point pressure to be determined for the actual conditions of the moulding process.

The pressure of the melted plastics is correlated to the intrinsic viscosity of the material and the rheological behaviour of the material depends on the humidity value of the material. Control of the pressure of the melted plastics according to the humidity of the material before melting enables a moulding process to be obtained that takes account of the actual rheological behaviour of the material.

A material made of plastics (polymer resin) with a low quantity of residual humidity will in molten state have greater intrinsic viscosity and thus greater pressure (injection and/or transfer and/or extrusion and/or compression pressure) that is greater than plastics with a greater quantity of residual humidity.

The operator that has to manage the apparatus 1 for processing the material (polymer resin), can initially enter (manually) an initial pressure limit value $P0_{LIM}$ on the basis of which the apparatus 1 will start the process of melting and moulding the material and can start an automatic procedure of "tracking" a desired value $P_{LIM}$ of the pressure limit by subsequent measurement (periodically, at preset time intervals or calculated each time) of various humidity values of the material before melting $H1_M$, $H2_M$, $H3_M$, . . . , calculating at each iteration a value of the limit pressure $P1_{LIM}$, $P2_{LIM}$, $P3_{LIM}$, . . . , using the reference value $H_R$ of the humidity, where the aforesaid reference value $H_R$ can be prescribed, for example, on the basis of the type of the material, or on the basis of other parameters or conditions (the value of the residual humidity of the plastics is generally fundamental to ensuring the mechanical and/or thermal and/or physical performance of the material and consequently the features of the finished moulded product).

The control means of the apparatus 1 may be configured in such a manner as to control the means for dehumidifying the incoherent material on the basis of the aforesaid reference humidity value $H_R$, in particular by control of the flowrate of the process fluid that traverses the container 3 and/or by control of the temperature and/or of the dew point of the process fluid sent to the container 3 and/or removed from the container 3.

In particular, the control means of the apparatus 1 may be configured in such a manner as to increase the intensity of dehumidification (for example by increasing the flowrate and/or the temperature of the process fluid) if $H_M > H_R$ and so as to decrease the intensity of dehumidification (for example by decreasing the flowrate and/or the temperature of the process fluid) if $H_M < H_R$.

When the function of automatic control of the pressure is activated, if the residual humidity value present in the plastics exiting the dehumidification container 3 (hopper) is less than the reference value $H_R$ (this reference humidity value $H_R$ or limit value, can be, in particular, a value set in the control and management system of the means for dehumidifying) this means that the intensity of dehumidification (i.e. the energy transmitted to the material, which depends on the flowrate of the process fluid that traverses the container 3 and on the temperature and dew point difference of the process fluid at the inlet and at the outlet of the container 3) is higher than that required by the plastics in the current process conditions. In this situation, the value of the pressure of the molten material is higher than a desirable value, so that the control process will lower the value of the pressure by a variation value ΔP (settable and modifiable as a factory parameter).

In an opposite situation, if the residual humidity value present in the plastics exiting the dehumidification container 3 is greater than the reference humidity value $H_R$ (limit value set in the control of the means for dehumidifying) this means that the intensity of dehumidification (energy transmitted to the material) is lower than that required by the plastics in the current process conditions. In this situation, the value of the pressure of the molten material is lower than a desirable value, so that the control process will raise the value of the pressure by a variation value ΔP (settable and modifiable as a factory parameter).

The electronic control means may be configured to adjust the pressure of the molten material (for example the pressure measured by the pressure sensor 10) by intervening on at least one operating parameter of the melting device 7 and/or of the moulding device 8, taking account of the set point value of the pressure $P_{LIM}$ set automatically (for example for subsequent iterations).

The actual value of the pressure of the plastics in molten state may be detected directly, with a pressure sensor as disclosed previously, or indirectly, for example by means for measuring at least one operating parameter of the melting device 7 and/or of the moulding device 8 and by means for converting the measured value of this parameter into a corresponding value of the pressure of the material in molten state.

It is possible, for example, to measure a hydraulic pressure exerted on a hydraulic actuator operationally associated with the melting device 7 (for example a linear hydraulic actuator that starts up an extruder) and then convert the measured value (for example the hydraulic pressure of the hydraulic actuator), by suitable conversion factors, into a value of the injection pressure of the plastics in molten state entering the moulding device 8.

The indirect measurement of the pressure of the plastics in molten state may be calculated in other ways, for example by measuring the power consumed by the melting device 7 and/or by the moulding device 8, using also in this case suitable conversion factors.

The indirect measurement of the pressure of the plastics in molten state may be performed, for example, by detecting an electric signal equivalent to, or indicative of, or correlatable with, a pressure of the molten material, for example an injection pressure of a hydraulic system of an injection press. The electric signal may originate, in particular, from the melting device 7 and/or from the moulding device 8 and/or from other devices forming part of the apparatus for processing the material, for example from devices with a totally or partially electric drive. The electric signal may comprise, for example, a signal emitted by one or more load cells operationally associated with a hydraulic system of the device.

The adjusting action may be direct, i.e. may intervene directly on the pressure of the molten material, or may be indirect, i.e. intervene on a parameter indicating the pressure of the molten material and by means of which it is possible to determine the pressure of the molten material (as said previously, by conversion factors, calculations, tables, experimental data, etc).

The process disclosed above will thus enable, in a relatively short time, a correct and desirable value to be reached automatically of the pressure (injection and/or transfer and/or extrusion and/or compression pressure) of the molten material, regardless of the initial pressure value (set by the operator or preset by the manufacturer).

It has been observed that the method and the apparatus disclosed above enable a convergence on a correct and desirable value of the pressure of the molten material to be reached rapidly and automatically and a considerable reduction of the risk of instability in the moulding process to be obtained, with a consequent reduction of production waste during the adaptation transitions of moulding pressure.

In this description, the term "humidity" can mean, for example, absolute humidity, (i.e. the ratio between the mass of water and the volume that contains the mass of water), specific humidity (i.e. the ratio between the mass of water and the mass of dry substance contained in a given volume), relative humidity (i.e. the ratio between absolute humidity and saturation humidity), or other types of humidity considered in any manner.

In other embodiments, the pressure of the plastics in molten state may be adjusted according to other parameters, apart from the humidity of the dehumidified plastics still in incoherent solid state, as disclosed previously.

In particular, the pressure of the plastics in molten state may be adjusted as a function of the density and/or of the apparent specific weight of the dehumidified plastics in incoherent solid state, for example by increasing the set point value of the pressure if the density and/or the apparent measured specific weight of the dehumidified incoherent solid material is lower than a reference value, or by decreasing the set point value of the pressure if the density and/or the apparent measured specific weight of the dehumidified incoherent solid material is greater than a reference value.

In particular, the pressure of the plastics in molten state may be adjusted in function of a pressure and/or or of a temperature measured in the dehumidified plastics in incoherent solid state, for example by increasing the set point value of the pressure of the molten material if the pressure or the temperature measured in the incoherent dehumidified material is lower than a reference value, or by decreasing the set point value of the pressure of the molten material if the pressure or the temperature measured in the incoherent dehumidified material is greater than a reference value.

In particular, the pressure of the plastics in molten state may be adjusted according to the concentration of a given substance present in the dehumidified plastics in incoherent solid state, for example by increasing the set point value of the pressure if the concentration measured in the dehumidified incoherent solid material is lower than a reference value, or by decreasing the set point value of the pressure if the concentration measured in the dehumidified incoherent solid material is greater than a reference value.

The invention claimed is:

1. A method for processing material, comprising the steps of:
    dehumidifying incoherent material;
    transforming said dehumidified incoherent material into molten material;
    using said molten material for moulding;
    measuring at least one value of at least one physical-chemical feature of said dehumidified incoherent material; and
    adjusting a pressure (PLIM) of said molten material according to said measured value of at least one physical-chemical feature;

wherein the adjustment step comprises increasing or decreasing a set point value of said pressure as a function of the measured value.

2. The method according to claim 1, wherein said physical-chemical feature comprises a residual humidity (HM) of said dehumidified incoherent material.

3. The method according to claim 2, wherein said step of adjusting comprises comparing said residual humidity value ($H_M$) with a reference value ($H_R$) and then decreasing said pressure ($P_{LIM}$) if said humidity value ($H_M$) is lower than said reference value ($H_R$) or increasing said pressure ($P_{LIM}$) if said humidity value ($H_M$) is higher than said reference value ($H_R$).

4. The method according to claim 2, wherein:
the dehumidification of said incoherent material is performed by using a process fluid in a container;
said dehumidified incoherent material is transferred from an outlet of said container to an inlet of a melting device, where it is transformed into the molten material; and
a humidity ($H_M$) of said dehumidified incoherent material is measured at said outlet, or at said inlet or between said outlet and said inlet.

5. The method according to claim 1, wherein:
said dehumidified incoherent material is transformed into the molten material in a melting device;
said molten material is used to perform a moulding operation in a moulding device; and
said adjusted pressure ($P_{LIM}$) of said molten material comprises an extrusion pressure in said melting device, and/or a moulding pressure in said moulding device, and/or a transfer pressure between said melting device and said moulding device.

6. The method according to claim 1, wherein said adjustment step comprises comparing said measured value ($H_M$) of a physical-chemical feature with a reference value ($H_R$) and then decreasing or increasing said adjusted pressure ($P_{LIM}$) on the basis of said comparison.

7. The method according to claim 6, comprising the step of setting a variation pressure value ($\Delta P$), optionally modifiable, said pressure ($P_{LIM}$) being increased or decreased by said variation value ($\Delta P$).

8. The method according to claim 6, wherein said comparing and consequently decreasing or increasing is performed for subsequent iterations, optionally at preset time intervals.

9. The method according to claim 1, wherein said adjusting intervenes directly on the pressure of the molten material.

10. The method according to claim 1, wherein said adjusting intervenes indirectly on a parameter indicating the pressure of the molten material.

* * * * *